United States Patent [19]

Mackrodt et al.

[11] Patent Number: 5,137,862
[45] Date of Patent: Aug. 11, 1992

[54] OXIDATION CATALYSTS

[75] Inventors: William C. Mackrodt, Cheshire; Martin Fowles, N. Yorkshire; Michael A. Morris, Durham, all of England

[73] Assignee: Imperial Chemical Industries PLC, London, United Kingdom

[21] Appl. No.: 748,343

[22] Filed: Aug. 22, 1991

[30] Foreign Application Priority Data

Aug. 22, 1990 [GB] United Kingdom ............... 9018409

[51] Int. Cl.$^5$ ..................... B01J 21/06; B01J 23/10
[52] U.S. Cl. ................................. 502/303; 502/302; 502/304; 502/350; 502/351
[58] Field of Search ............. 502/302, 303, 304, 350, 502/351

[56] References Cited

U.S. PATENT DOCUMENTS

| 4,780,449 | 10/1988 | Hicks | 502/303 |
| 4,940,685 | 7/1990 | Sauvion et al. | 502/263 |
| 5,010,052 | 4/1991 | Quemere | 502/304 |

FOREIGN PATENT DOCUMENTS

| 928691 | 6/1963 | United Kingdom . |
| 1284285 | 8/1972 | United Kingdom . |
| 1392687 | 4/1973 | United Kingdom . |

OTHER PUBLICATIONS

Ter Maat et al, "Reactivity of Solids", Material Science Monograph, published by Elsevier, 28B, 1984 pp. 1021–1023.

Machida et al, Kidorui, 14 (1989), pp. 124–125 [CA 112 (9) 7612s].

Primary Examiner—W. J. Shine
Attorney, Agent, or Firm—Cushman, Darby & Cushman

[57] ABSTRACT

Compositions suitable for use as oxidation catalysts essentially free from elements, or compounds thereof, of Group VIII of the Periodic Table, comprise an intimate mixture of oxides of at least three elements selected from Groups IIIa and IVa of the Periodic Table, including, of the total number of Group IIIa and IVa element atoms present, a) a total of at least 60% of atoms of at least one element X selected from cerium, zirconium, and hafnium, b) a total of at least 5% of atoms of at least one other element Y different from element X and selected from the variable valency elements titanium, cerium, praseodymium, and terbium; and c) a total of at least 5% of atoms of at least one element Z differing from X and Y and selected from Group IIIa elements.

Such compositions, and similar two component compositions wherein X and Y are both cerium, have, after heating for 8 hours at 1200° C., a BET surface area of at least 1 m$^2$.g$^{-1}$ and are particularly useful for the oxidation of a feedstock with an oxygen-containing gas, eg catalytic combustion, especially under conditions such that the catalyst attains a temperature of at least 1000° C.

6 Claims, No Drawings

OXIDATION CATALYSTS

This invention relates to catalytic oxidation and in particular to catalysts suitable for the oxidation of a feedstock with an oxygen-containing gas, e.g. air.

One particular form of such oxidation is the combustion of a fuel with air, particularly with an excess of air to effect complete combustion.

In order to reduce the formation of oxides of nitrogen (NOx) when a fuel, eg gaseous hydrocarbons such as natural gas and/or hydrogen is combusted with air, it is desirable to employ fuel/air mixtures of such composition that the adiabatic flame temperature is relatively low, desirably below about 1300° C. For many applications this means using a composition that is so rich in air that normal combustion is unstable and may not be selfsustaining. Catalytic combustion wherein a mixture of the fuel and air is passed through a bed of a combustion catalyst, enables such problems to be overcome.

One application wherein catalytic combustion is desirable is in gas turbines. At initial start-up of a gas turbine, a mixture of the fuel and air, preheated, for example by a pilot burner, to a temperature typically of the order of 600°–800° C. when the fuel is methane or natural gas, is fed, normally at superatmospheric pressure, e.g. at a pressure in the range 2 to 20 bar abs., to the inlet of the combustion catalyst bed. Combustion is effected at the catalyst surface forming a gas stream at elevated temperature. There is a rapid rise in the temperature of the catalyst bed to about the adiabatic flame temperature, typically about 1200° C., when the catalyst lights-off. The point at which this occurs is associated with the pre-heat temperature and the catalyst activity. Until light-off occurs, the solid temperature rises exponentially along the bed length. The average temperature of the gas mixture increases more gradually as the gas mixture passes through the bed reflecting the increasing degree of combustion of the mixture. When the temperature of the gas mixture reaches a value, typically about 900° C., at which homogeneous combustion commences, there is a rapid increase in the gas temperature to about the adiabatic flame temperature. When operating a gas turbine with catalytic combustion, when combustion has been established, it is usually desirable to decrease the preheating of the feed, e.g. to the temperature, typically about 300°–400° C., corresponding to the discharge temperature of the compressor compressing the air and fuel.

It is seen therefore that the catalyst has to exhibit catalytic activity at a relatively low feed temperature but has to withstand heating to relatively high temperatures of the order of 1000° C. or more without loss of that low temperature activity.

Also, in gas turbine operation using catalytic combustion, the catalyst not only has to be able to withstand high temperatures, but also withstand the thermal shock of rapid temperature changes resulting from repeated stopping and starting of combustion. Also gas turbines are usually operated using high gas flow rates. These conditions impose severe restraints on the materials that can be utilised as the catalyst.

Combustion catalyts used under less severe conditions have commonly employed one Group VIII metals and/or oxides thereof supported on a suitable refractory support material. Examples of such metals and oxides that have been proposed include platinum group metals, such as platinum, palladium, or rhodium, or mixtures thereof, or iron, or nickel, in the metal or oxide form. We have found that for applications involving adiabatic flame temperatures above about 1000° C., those catalysts are unsuitable. Thus in order to obtain a satisfactory activity the catalytically active material has to exhibit a high surface area; at the temperatures that are liable to be encountered, the aforementioned catalysts rapidly lose activity as a result of thermal sintering giving a decrease in the surface area and/or as a result of the active material having an appreciable vapour pressure at such temperatures with consequential loss of active material through volatilisation, particularly where the gas stream has a high velocity gas stream.

We have found that certain oxidic compositions that are essentially free from Group VIII metals or compounds thereof are particularly effective as combustion catalysts. Catalysts containing rare-earth oxides, ie the oxides of elements of atomic number 57-71, particularly ceria, have been proposed for catalytic combustion in numerous references, but those compositions generally also contain Group VIII metals as an active component, and so are unsuitable in applications where the Group VIII metal or oxide is liable to sinter and/or volatilise.

The rare earth oxides, ceria, terbia, and praseodymia are ionic oxides having the fluorite structure: this class of oxides also includes stabilised zirconia, and hafnia., Ceria, terbia, and praseodymia have defective structures and can be considered to be oxygen-deficient; terbia and praseodymia being more oxygen-deficient than ceria. It is believed that oxygen-deficient materials give rise to catalytic activity, although ceria by itself has little catalytic combustion activity.

For use as a catalyst, one parameter of importance is its surface area, a high surface area being necessary. Materials of high surface area can be obtained, for example by careful evaporation of a solution of the corresponding nitrates or by precipitation of the oxide, or a precursor thereto. However we have found that exposure of high surface area oxidic materials having a high level of oxygen-deficiency to high temperatures results in sintering with consequent loss of surface area and catalytic activity. As a result the more highly oxygen-deficient fluorite oxides, praseodymia and terbia, are not themselves suitable as combustion catalysts.

We have found that certain ionic oxide compositions having the fluorite structure and containing two or more oxides of elements selected from Group IIIa (including the rare earths) or Group IVa of the Periodic Table (as published in the UK "Abridgements of Patent Specifications"), and including one or more oxygen-deficient oxides, give catalysts that have significantly increased activity and that retain an adequate surface area after exposure to high temperatures.

It has been proposed by Machida et al in Kidorui 14 (1989) p124–5 [Chem Abs 112 (9) 76121s] to employ a catalyst composition comprising ceria and ytterbia for the oxidative coupling of methane, but there is no indication that those catalysts would be of utility in at temperatures above 1000° C.

It has been proposed in U.S. Pat. No. 4,940,685 to stabilise high surface area ceria compositions for use as catalysts, or as supports for catalytic metals such as platinum, against sintering on exposure to high temperatures by the incorporation of up to 20%, particularly up to 5%, of oxides of elements such as aluminium, silicon, zirconium, thorium, or rare earths, such as lanthanum. There is however no suggestion that the stabiliser enhances the activity of ceria catalysts, nor that the stability is retained at temperatures above 1000° C.

It has been proposed by Ter Maat et al in "Reactivity of Solids" (a Material Science Monograph edited by Barrett & Dufour, published by Elsevier, 28B, 1984, pages 1021-1023) to employ certain compositions having a pyrochlore structure for the oxidation of carbon monoxide with oxygen. The pyrochlore compositions are said to have the structure $A_2B_2O_7$ where A is a trivalent metal, e.g. a rare earth such as neodymium, and B is a tetravalent metal such as zirconium. Ter Maat et al show that the replacement of up to 20% of the zirconium atoms by cerium atoms increases the activity of the catalyst. It is seen that in these materials there are equal numbers of the metal A (e.g. neodymium) and metal B (e.g. zirconium plus cerium) atoms.

The present invention provides an oxidation process comprising reacting a feedstock with an oxygen-containing gas in the presence of an oxidic catalyst under conditions such that the catalyst attains a temperature of at least 1000° C. wherein the catalyst is essentially free from elements, or compounds thereof, of Group VIII of the Periodic Table, and, after heating for 8 hours at 1200° C. has a BET surface area of at least 1 $m^2.g^{-1}$, and comprises an intimate mixture of oxides of at least two elements selected from Groups IIIa and IVa of the Periodic Table, including, of the total number of Group IIIa and IVa element atoms present, a) a total of at least 60% of atoms of at least one element selected from cerium, zirconium, and hafnium, and b) a total of at least 5% of atoms of at least one Group IIIa element other than cerium: provided that a total of at least 5% are atoms of at least one variable valency element selected from titanium, cerium, praseodymium, and terbium; and the elements present include titanium and at least one Group IIIa element, or at least two Group IIIa elements; and the total amount of any cerium and any non-variable valency Group IIIa atoms is at least 5%.

The catalysts used in the present invention notionally can be considered to consist of three components: an oxidic host material, an oxide of a variable valency element, and an oxide of a trivalent element that may be different from the variable valency element. As will be explained below, in some cases, oxides of the same element can perform two of these functions.

The catalytic oxidation reaction is thought to involve adsorption of oxygen atoms at the surface of the catalyst and the reaction of adsorbed oxygen with an electron to form a negatively charged oxygen species. It is believed that the variable valency element, herein designated Y, having a "defective structure", provides a source of electrons, and an adjacent, different, trivalent element, designated Z, provides oxygen vacancies at the surface enabling oxygen to be adsorbed.

Cerium, praseodymium, titanium, and terbium are suitable variable valency elements Y. However praseodymia and terbia are so highly defective that they would rapidly loose surface area if unsupported. Titania does not have the fluorite structure and has a much lower melting point than the rare earths: also, under reducing conditions it forms sub-oxides. Consequently, while cerium can be used as both the host element, designated X, and as the variable valency element Y, in the case of praseodymium, terbium, or titanium as the variable valency element Y, a support is also required to provide the necessary thermal stability.

The host material is a selected from zirconia, ceria, and hafnia. These oxides have the fluorite structure which gives, and retains, an adequate high surface area in use. Since zirconia undergoes phase changes accompanied by significant volume expansion in the temperature range to which the catalyst is liable to be subjected in use, it has been conventional to incorporate stabilisers such as yttria, magnesia, or calcia, when using zirconia as a catalyst support. In the present invention, the oxides of the elements Y and/or Z will act as the necessary stabiliser. The support may comprise mixtures of oxides of different elements X.

As mentioned above, the second component is an oxide of a variable valency element Y selected from praseodymium, terbium, cerium, and titanium. Mixtures may be employed. While cerium may be used as both the host element X and as the variable valency element Y, ceria does not have a very defective structure and so praseodymium and terbium are preferred as the variable valency element Y, especially where cerium is the host element X.

The third component of the catalyst is an oxide of a trivalent Group IIIa metal Z and is different to element Y. Examples of such oxides are scandia, yttria, lanthana, ceria, praseodymia, neodymia, samaria, gadolinia, and terbia. While variable valency rare earths, viz. cerium, praseodymium, and terbium, can be used as the third element Z, it is preferred that element Z is not a variable valency element, and, as it has been found that, at least for compositions containing only rare earth oxides, the catlytic activity increases as the trivalent ionic radius of the Group IIIa metal Z increases, lanthana is strongly preferred as the oxide of the element Z. Mixtures of oxides of different Group IIIa metals may be employed as element Z.

As noted above cerium can perform the function of host element X and variable variency element Y or trivalent element Z, and likewise praseodymium and terbium can perform the functions of variable valency element Y and trivalent element Z. It may not therefore be possible to distinguish between the functions of the cerium, praseodymium and terbium.

The catalysts comprise an intimate mixture of oxides wherein, of the total number of Group IIIa and IVa element atoms present, a total of at least 60% are atoms of cerium, zirconia, or hafnium, ie the host element X, or, in the case of cerium, also the variable valency element Y. As a result the proportion of the trivalent Group IIIa element Z present is less than 40%. In the catalysts of the invention a total of at least 5% of the Group IIIa and Group IVa element atoms are at least one Group IIIa element other than cerium, thereby excluding catalysts comprising only ceria. To ensure that there is an adequate amount of the variable valency atoms, a total of at least 5% of the Group IIIa and Group IVa element atoms are atoms of the variable valency element selected from titanium, cerium, praseodymium, and terbium. Since the compositions require Z atoms differing from Y atoms, the catalysts contain either oxides of at least two Group IIIa elements, at least one of which is a variable valency Group IIIa element, or oxides of titanium and at least one Group IIIa element. In order that there can be an adequate amount of Z atoms, the total amount of cerium (which can act as Z atoms) and/or non-variable valency Group IIIa element present is at least 5% of the total Group IIIa and Group IVa element atoms.

In preferred compositions containing praseodymia or terbia as the variable valency element, there are about 0.5 to 2.5 non-variable valency Group IIIa element atoms for each variable valency element atom other than ceria.

During the production, or use, of the catalyst it is subjected to high temperatures. It is believed that such heating gives rise to in migration of some species within the bulk of the catalyst with the formation of a different atomic composition and/or structure at the catalyst surface from that of the bulk catalyst. Although we do not wish to be limited by the following explanation, it is possible that the active species at the catalyst surface has the pyrochlore structure of the type described in the aforementioned paper by Ter Maat et al, e.g. a composition of the form $Z_2.(X_{1-x}.Y_x)_2.O_7$, where x is typically up to 0.2, bulk compositions having such a large proportion of the element Z have been found to have a relatively low activity, possibly as a result of the element Z oxide, ie $Z_2O_3$, rapidly segregating during heating during preparation of the catalyst and/or use to form discrete "islands" of the $Z_2O_3$ phase at the catalyst surface with consequent decrease in the area of active species accessible to the gaseous species to be adsorbed.

In preferred compositions the only oxides present are those of rare earths, so that cerium is the host element X, and element Y is cerium, terbium, and/or praseodymium, and element Z is cerium or at least one other rare earth, provided that both Y and Z are not both cerium. Preferably the components are present in such proportions that, of the total number of rare earth atoms present, the cerium atoms form 60-95%, the terbium atoms form 0-30%, the praseodymium atoms form 0-40%, and said other rare earth metal atoms form 0-40%.

Certain of the above compositions, those containing three or more components, are believed to be novel.

Accordingly the present invention also provides a composition that is essentially free from elements, or compounds thereof, of Group VIII of the Periodic Table, and comprises an intimate mixture of oxides of at least three elements selected from Groups IIIa and IVa of the Periodic Table, including, of the total number of Group IIIa and IVa element atoms present, a) a total of at least 60% of atoms of at least one element X selected from cerium, zirconium, and hafnium, b) a total of at least 5% of atoms of at least one other element Y different from element X and selected from the variable valency elements titanium, cerium, praseodymium, and terbium; and c) a total of at least 5% of atoms of at least one element Z differing from X and Y and selected from Group IIIa elements.

Preferred compositions contain ceria, a) praseodymia and/or terbia, and b) at least one other rare earth oxide.

While the incorporation of terbia, and/or rare earths other than praseodymia or lanthana, gives some improvement to the activity of ceria based compositions, the most significant increases in activity are found when the composition contains ceria, and praseodymia and/or lanthana.

Particularly preferred compositions comprise an intimate mixture in which cerium atoms form 60 to 90% and a) praseodymium atoms form 5 to 35%, particularly 15-35%, and/or b) lanthanum atoms form 5 to 40%, of the total number of rare earth metal atoms. Particularly preferred compositions contain ceria, and both praseodymia and lanthana.

Particularly preferred compositions comprise oxides of cerium, praseodymium, and at least one non-variable valency rare earth, especially lanthanum, in which 5-10% of the total rare earth atoms are praseodymium atoms and there are 0.5 to 2.5 non-variable valency rare earth atoms for each praseodymium atom.

The compositions, after heating for 8 hours at 1200° C., have a BET surface area of at least 1 $m^2.g^{-1}$. Suitable compositions may be made by precipitation. Thus the intimate mixture of oxides may be formed by precipitating compounds of the relevant metals as compounds as oxides, or as compounds that decompose to oxides upon heating, from a solution of a suitable compound, e.g. nitrate, of the relevant element. The precipitation is conveniently effected from an aqueous solution using a precipitant such as an aqueous solution of an alkali metal, or ammonium, hydroxide or carbonate. The compounds required in the composition may be co-precipitated, e.g. by precipitation from a solution containing a mixture of compounds of the desired metals, or pre-formed precipitates may be intimately mixed, preferably before they are separated from the precipitation medium: for example a sequential precipitation procedure may be adopted wherein one component desired in the composition is precipitated into a slurry containing the previously formed precipitate of another component. After precipitation, the precipitate or precipitates are washed to remove traces of the precipitant, dried, and then calcined if necessary to decompose the precipitated compounds to the oxides. By this method it is possible to obtain compositions which have a BET surface area above 1 $m^2.g^{-1}$ even after heating the composition for 8 hours at 1200° C.

Other methods of producing suitable intimate mixtures are known in the art and include evaporation of a solution containing a mixture of thermally decomposable compounds, especially nitrates, of the relevant metals to dryness followed by calcination to decompose the compounds to the oxides. Optionally the solution may contain an organic complexing acid, e.g. citric acid. Yet another method involves ball milling a mixture of the oxides or compounds thermally decomposable thereto.

The catalyst will generally be required in a supported form: a suitable refractory support, e.g. alumina, mullite, or silicon carbide, preferably in the form of a honeycomb having a plurality of through passages, preferably at least 25 passages per $cm^2$ of the honeycomb cross sectional area, may be coated with a slurry of the catalyst composition, followed by firing to form an adherent coating. Since there may be a tendency for some components of the catalyst to selectively migrate into the support, thereby depleting the catalyst coating of that component, it may be desirable to provide a barrier coat, for example of zirconia, between the support and the catalytic layer, to minimise such migration, and/or to provide the support with a succession of coatings of differing composition such that negligible migration takes place from the outermost coating. Where a zirconia barrier coat is employed, this is preferably of unstabilised zirconia: we have found that in the present compositions the usual sorts of stabilised zirconia, e.g. yttria-stabilised zirconia, give less satisfactory results. Alternatively the catalyst may itself be formed into the desired shape, e.g. by extrusion into a honeycomb structure by the process described in GB-A-1385907, particularly using the technique described in EP-A-134138. However in order to provide a catalyst that can withstand the thermal shock that is liable to be encountered in some catalytic combustion applications, e.g. gas turbines, where the catalyst is to be used in a self-supporting form, it is preferred that it is produced in the form of a ceramic foam, for example by the processes described in GB-A-1537549 and GB-A-2027688. Alternatively the catalyst may be a coating on such a foam made from a suitable support material.

For catalytic combustion, typical operating conditions for the catalyst involve the passage of preheated fuel gas, e.g. natural gas, and air through a bed of the catalyst, e.g. through one or more honeycomb structures supporting or composed of the catalyst. During passage through the catalyst bed, combustion takes place with consequent increase in temperature. The outlet temperature is typically above 1000° C., particularly above 1100° C.

In gas turbine applications, the flow rate of the fuel gas and air is high; typically the linear velocity of the fuel and air mixture through the catalyst is in the range 25-150, particularly 50-100, m.s$^{-1}$.

Another catalytic combustion application for which the catalysts are particularly suited as catalysts in radiant burners.

In addition to catalytic combustion, other oxidation processes are often operated at temperatures where stability of the catalyst is desirable. Examples of such other oxidation processes include partial oxidation of feedstocks such as propane, methane coupling, ammonia oxidation, the oxidative decomposition of nitrous oxide, and steam reforming of hydrocarbons. In addition, the catalysts of the present invention may be useful in oxidation reactions effected at relatively low temperatures, e.g. the oxidation of paraxylene to terephthalic acid.

The invention is illustrated by reference to the following Examples, some of the compositions of which are given by way of comparison.

EXAMPLES 1-45

In examples 1-21 and 36-40, the catalysts were prepared by forming an aqueous solution of nitrates of the desired elements in the desired proportions: the strength of the solution was such that the total metal content of the solution was about molar. The metals were precipitated from this solution by addition of 2M ammonium bicarbonate solution at ambient temperature and the precipitate filtered, washed until free from alkali and then dried at 120° C. for 16 hours. The dried precipitate was formed into pellets.

The three and four component catalysts of Examples 22-35 and 41-44 were made by mixing solutions of nitrates of the relevant metals in the desired proportions followed by evaporation of the solutions to dryness, calcination at 450° C.

Catalytic activity is assessed by the following technique. A sample of the catalyst is heated in a stream of air for 8 hours at 1200° C. to age the catalyst and is then crushed and sieved to obtain a size fraction in the range 1-1.4 mm diameter. After ageing, the samples in accordance with the present invention had a BET surface area in an excess of 1 m$^2$.g$^{-1}$. A known weight, occupying a volume of about 2.5 cm$^3$, of the aged material is charged to an electrically heated reactor provided with an outlet gas analyser to monitor the carbon dioxide content of the outlet gas. A mixture of air containing 2% by volume of methane is passed through the reactor at atmospheric pressure at a rate of 0.5 m$^3$.h$^{-1}$ and the temperature increased from ambient temperature to 400° C. at a rate of 400° C.h$^{-1}$ and then at a rate of 200° C.h$^{-1}$ until the monitored carbon dioxide content of the outlet gas indicates that the combustion is complete. To aid comparison between different catalysts, the rate of carbon dioxide formation per gram of catalyst at a temperature of 600° C. is determined. The activity at this temperature was chosen since at this temperature the extent of reaction is relatively small so that the bed approximates to isothermal conditions. At higher temperatures, particularly with the more active catalysts, an appreciable temperature rise would occur thus obscuring comparison.

The compositions and results are shown in the following Table 1.

TABLE 1

| Example | Composition (% by metal atoms) | | | | | Activity (mmol/h/g) |
|---|---|---|---|---|---|---|
| | Ce | Pr | Tb | La | Other | |
| 1 | 100 | | | | | 1 |
| 2 | | 100 | | | | 0 |
| 3 | | | 100 | | | 0 |
| 4 | | 100 | | | | 0 |
| 5 | | | | | Gd 100 | 0 |
| 6 | 95 | 5 | | | | 5 |
| 7 | 75 | 25 | | | | 26 |
| 8 | 50 | 50 | | | | 12 |
| 9 | 25 | 75 | | | | 3 |
| 10 | 95 | | 5 | | | 8 |
| 11 | 95 | | | 5 | | 12 |
| 12 | 93 | | | 7 | | 14 |
| 13 | 90 | | | 10 | | 15 |
| 14 | 87.5 | | | 12.5 | | 26 |
| 15 | 75 | | | 25 | | 27 |
| 16 | 50 | | | 50 | | 14 |
| 17 | 25 | | | 75 | | 6 |
| 18 | 95 | | | | Gd 5 | 3 |
| 19 | 95 | | | | Sm 5 | 4 |
| 20 | 90 | | | | Sm 10 | 10 |
| 21 | 80 | | | | Sm 20 | 7 |
| 22 | 90 | 5 | | 5 | | 13 |
| 23 | 80 | 10 | | 10 | | 40 |
| 24 | 75 | 8 | | 17 | | 44 |
| 25 | 70 | 15 | | 15 | | 41 |
| 26 | 60 | 30 | | 10 | | 21 |
| 27 | 60 | 20 | | 20 | | 29 |
| 28 | 60 | 10 | | 30 | | 22 |
| 29 | 50 | 25 | | 25 | | 10 |
| 30 | 50 | 5 | | 45 | | 13 |
| 31 | 25 | 50 | | 25 | | 5 |
| 32 | 25 | 25 | | 50 | | 11 |
| 33 | 90 | | 5 | 5 | | 9 |
| 34 | 80 | | 10 | 10 | | 22 |
| 35 | 70 | | 15 | 15 | | 20 |
| 36 | 95 | | | | Sc 5 | 2 |
| 37 | 95 | | | | Yt 5 | 2 |
| 38 | 95 | | | | Nd 5 | 5 |
| 39 | 90 | | | | Nd 10 | 10 |
| 40 | 85 | | | | Nd 15 | 7 |
| 41 | 80 | 5 | 5 | 10 | | 22 |
| 42 | 80 | 8 | 2 | 10 | | 22 |
| 43 | 75 | 10 | 5 | 10 | | 23 |
| 44 | 75 | 20 | 5 | | | 17 |

Examples 1-5 show that the rare earths ceria, praseodymia, terbia, lanthana and gadolinia themselves have negligible activity. Examples 6-10 show that the addition of praseodymia or terbia to ceria gives a significant improvement to the activity, but at high praseodymia levels the improvement over ceria alone is only marginal. Examples 11 to 21 show that the modification of ceria by the incorporation of lanthana, gadolinia, or samaria, gives an improvement in activity, and this is particularly marked in the case of lanthana, although the improvement decreases at high lanthana levels. Examples 22 to 32 show that particularly beneficial results are obtained by using ceria, praseodymia, lanthana mixtures. Examples 33 to 35 show ceria, terbia, lanthana mixtures. Examples 36 and 37 show the use of scandia or yttria in place of a rare earth as a modifier for ceria. Examples 38 to 40 show ceria/neodymia mixtures. Examples 41 to 43 show four component compositions and Example 44 shows a ceria/praseodymia/terbia mixture.

EXAMPLE 45

A zirconia/yttria/praseodymia composition was made up by evaporation of a mixed nitrates solution as described above to give the proportions, by metal atoms, Zr 66.4, Yt 16.7 and Pr 16.7. The activity when tested as above, was 7 mmoles/g/h. The aged sample had a BET surface area of 3.2 m²/g.

EXAMPLE 46

To illustrate the segregation of lanthana from a ceria/lanthana composition to the surface, a composition was made containing 5% lanthana and 95% ceria (by metal atoms) by the precipitation route described above. Samples of the composition, after calcining at 450° C., were aged for 4 hours at different temperatures, and the composition of the surface, rather than the bulk, determined by X-ray photoelectron spectroscopy. The results are shown in the following Table 2.

TABLE 2

| Ageing temperature (°C.) | La in surface composition (% by metal atoms) |
| --- | --- |
| 450 | 5 |
| 900 | 15 |
| 1100 | 41 |
| 1200 | 48 |
| 1300 | 50 |
| 1400 | 60 |
| 1500 | 92 |

This example clearly demonstrates that considerable segregation of the lanthanum atoms takes place on ageing at high temperatures. It is seen that at about 1200°-1300° C., the surface has a composition approximating to a half monolayer coverage of lanthana, but at higher ageing temperatures a much higher proportion of the surface was lanthana.

EXAMPLE 47

A further series of ceria/praseodymia/lanthana compositions was made by the evaporation of nitrates solution method described above, calcined at 450° C., and then aged for 8 hours at different temperatures. The activity of these compositions was tested as described above but at a temperature of 561° C. The compositions, activities, and surface areas after ageing at the specified temperature ($T_{age}$) are as set out in the following Table 3.

TABLE 3

| Composition (% metal atoms) | | | Activity (mmol/g/h) at $T_{age}$ (°C.) | | | Surface area (m²/g) at $T_{age}$ (°C.) | | |
| --- | --- | --- | --- | --- | --- | --- | --- | --- |
| Ce | Pr | La | 1100 | 1200 | 1300 | 1100 | 1200 | 1300 |
| 75 | 0 | 25 | 13 | 7 | 3 | 7.2 | 4.5 | 2.1 |
| 75 | 8 | 17 | 31 | 10 | 5 | 6.8 | 4.4 | 1.8 |
| 75 | 17 | 8 | 11 | 8 | 3 | 6.0 | 3.3 | 1.3 |
| 75 | 25 | 0 | 34 | 6 | 4 | 9.0 | 2.4 | 1.0 |
| 60 | 35 | 5 | 7 | 4 | 1 | 3.2 | 1.1 | 0.4 |
| 60 | 30 | 10 | 13 | 7 | 4 | 3.9 | 2.5 | 1.2 |
| 60 | 20 | 20 | 12 | 10 | 4 | 4.9 | 3.2 | 1.7 |
| 60 | 10 | 30 | 14 | 3 | 5 | 5.1 | 3.5 | 2.0 |
| 60 | 5 | 35 | 13 | 6 | 2 | 4.4 | 2.2 | 0.7 |
| 75 | 12.5 | 12.5 | 23 | 10 | 4 | 6.9 | 3.6 | 1.4 |
| 96 | 2 | 2 | 6 | 2 | 1 | 4.1 | 1.7 | 0.8 |

The surface composition of some of the above samples aged at 1200° C. was determined by X-ray photoelectron spectroscopy. The bulk and surface compositions were as shown in the following Table 4.

TABLE 4

| Bulk composition (% metal atoms) | | | Surface composition (% metal atoms) | | | | | |
| --- | --- | --- | --- | --- | --- | --- | --- | --- |
| | | | Aged at 1200° C. | | | Aged at 1300° C. | | |
| Ce | Pr | La | Ce | Pr | La | Ce | Pr | La |
| 60 | 20 | 20 | 48 | 27 | 25 | 50 | 27 | 23 |
| 60 | 10 | 30 | 40 | 4 | 56 | 43 | 8 | 49 |
| 75 | 17 | 8 | 62 | 27 | 11 | 63 | 26 | 11 |
| 75 | 8 | 17 | — | — | — | 66 | 13 | 21 |
| 96 | 2 | 2 | 91 | 4 | 5 | 89 | 5 | 6 |

This again shows that there is substantial migration, particularly of lanthanum atoms from the bulk to the surface.

We claim:

1. A catalyst composition that is essentially free from elements, or compounds thereof, of Group VIII of the Periodic Table, and comprises an intimate mixture of oxides of at least three elements selected from Group IIIa and IVa of the Periodic Table, including, of the total number of Group IIIa and IVa element atoms present, a) a total of at least 60% of atoms of at least one element X selected from cerium, zirconium, and hafnium, b) a total of at least 5% of atoms of at least one other element Y different from element X and selected from the variable valency elements titanium, cerium, praseodymium, and terbium; and c) a total of at least 5% of atoms of at least one element Z differing from X and Y and selected from Group IIIa elements, said composition, after heating at 1200° C. for 8 hours, having a BET surface area of at least 1 m².g$^{-1}$.

2. A composition according to claim 1 containing ceria together with praseodymia and lanthana.

3. A composition according to claim 2 wherein the cerium atoms form 60 to 90%, praseodymium atoms form 5 to 35%, and lanthanum atoms form 5 to 40%, of the total number of rare earth metal atoms in the composition.

4. A composition according to claim 1 containing praseodymia or terbia as the variable valency element, having 0.5 to 2.5 non-variable valency Group IIIa element atoms for each variable valency element atom other than ceria.

5. A composition according to claim 4 comprising ceria, praseodymia, and a non-variable valency rare earth, in which 5-10% of the total rare earth atoms are praseodymium atoms and there are 0.5 to 2.5 non-variable valency rare earth atoms for each praseodymium atom.

6. A composition according to claim 1 in the form of a coating on a refractory support.

* * * * *